(12) United States Patent
Boutanos

(10) Patent No.: US 12,466,104 B1
(45) Date of Patent: Nov. 11, 2025

(54) SYSTEM AND METHOD FOR INSTALLATION OF CABINET DOORS

(71) Applicant: Fadi Boutanos, Newmarket (CA)

(72) Inventor: Fadi Boutanos, Newmarket (CA)

(*) Notice: Subject to any disclaimer, the term of this patent is extended or adjusted under 35 U.S.C. 154(b) by 475 days.

(21) Appl. No.: 17/975,779

(22) Filed: Oct. 28, 2022

Related U.S. Application Data

(63) Continuation-in-part of application No. 16/597,940, filed on Oct. 10, 2019, now abandoned.

(51) Int. Cl.

| | |
|---|---|
| *B27M 3/18* | (2006.01) |
| *B23B 39/16* | (2006.01) |
| *B25B 21/00* | (2006.01) |
| *B25H 7/02* | (2006.01) |
| *E05D 11/00* | (2006.01) |
| *E06B 3/36* | (2006.01) |

(52) U.S. Cl.
CPC ............... *B27M 3/18* (2013.01); *B25H 7/02* (2013.01); *E05D 11/0009* (2013.01); *E06B 3/36* (2013.01); *A47B 2220/0069* (2013.01); *B23B 39/162* (2013.01); *B25B 21/007* (2013.01)

(58) Field of Classification Search
CPC . B23B 39/162; B23B 47/287; B23B 2247/00; B25B 21/007; B25B 11/00; B25B 11/02; E05D 11/0009; B25H 7/02; B27M 3/18; G01B 3/30
See application file for complete search history.

(56) References Cited

U.S. PATENT DOCUMENTS

| | | | | |
|---|---|---|---|---|
| 4,093,202 A | * | 6/1978 | Kincaid | E05D 11/0009 |
| | | | | 269/904 |
| 4,686,769 A | * | 8/1987 | Rock | E05B 17/06 |
| | | | | D10/64 |
| 5,604,988 A | * | 2/1997 | Costelloe | B26B 29/06 |
| | | | | 33/526 |
| 8,893,394 B2 | * | 11/2014 | Parkin | G01B 3/30 |
| | | | | 33/562 |
| 9,333,642 B2 | | 5/2016 | Courtney | |
| 9,347,250 B1 | * | 5/2016 | Metcalf | E05D 11/0009 |

(Continued)

FOREIGN PATENT DOCUMENTS

| | | | | |
|---|---|---|---|---|
| DE | 10239692 A1 | * | 3/2004 | ......... E05D 11/0009 |
| GB | 2405119 A | * | 2/2005 | ............. B25B 11/00 |
| GB | 2433905 A | * | 7/2007 | ........... B23B 47/287 |

OTHER PUBLICATIONS

Veronesi, Keith; "Door Height Installation Jig"; Published Mar. 6, 2017; YouTube https://www.youtube.com/watch?v=hOq9_HHTMcA (Year: 2017).*

(Continued)

*Primary Examiner* — Matthew P Travers
(74) *Attorney, Agent, or Firm* — Sanchelima & Associates, P.A.; Jesus Sanchelima; Christian Sanchelima

(57) ABSTRACT

A system and method for installation of cabinet doors including a hardware installation kit. The hardware installation kit includes a door support, a multi-dimension spacer, a hinge spacer and a multi drill-bit jig. The door support and the multi-dimension spacer are used to support a cabinet door before being fixed to a cabinet. The hinge spacer is used to evenly place a hinge. The hinge is used to connect the cabinet door with the cabinet. The hinge is fixed through inserting fasteners thereto through the multi dill-bit jig.

13 Claims, 8 Drawing Sheets

(56) References Cited

U.S. PATENT DOCUMENTS

| | | | | |
|---|---|---|---|---|
| 2002/0106253 A1* | 8/2002 | Coleiro | ................ | B23B 47/287 |
| | | | | 408/115 R |
| 2006/0048369 A1* | 3/2006 | Klonowski | ............ | E05D 11/00 |
| | | | | 29/11 |
| 2017/0361382 A1* | 12/2017 | Kirby | ................... | B23B 39/162 |

OTHER PUBLICATIONS

WOOD Magazine Staff; "Door-hanging jig frees your mind and hand"; Published Jan. 4, 2018; WOOD Magazine; https:/ www.woodmagazine.com/jigs-stands-organizers/door-hanging-jig-frees-your-mind-and-hand (Year: 2018).*

Huber, Phil; "Door Mounting Aid"; Published Dec. 28, 2017; Woodsmith; https://www.woodsmith.com/article/door-mounting-aid/ (Year: 2017).*

Translation of DE10239692 (Year: 2004).*

* cited by examiner

SYSTEM AND METHOD FOR INSTALLATION OF CABINET DOORS

BACKGROUND OF THE INVENTION

1. Other Related Applications

The present application is a continuation-in-part of pending U.S. Patent Application No. 16,597,940, filed on Oct. 10, 2019, which is hereby incorporated by reference.

2. Field of the Invention

The present invention relates generally to cabinet, doors, and other hardware components installation, more particularly, to a method that uses a set of jigs, in the form of templates and tools, for installation of cabinet doors.

3. Description of the Related Art

Hardware components installation, like for cabinets, doors, drawers, etc., is a difficult task which requires a lot of experience. It is often time-consuming operation to measure and mark the positions for the cabinet pulls for each of the doors and drawers and often results in mistakes which if not caught, cause damaged or wasted materials and effort. It is even more the case, when the user is a non-professional. For instance, hanging a door on hinges within a door frame is a precise task that is prone to error. When done properly, the door fits snugly within the door frame when closed, with well-defined gaps around all four edge surfaces of the door. Further, when done properly, the door swings open freely on the hinges, and may stay open at any intermediate position between fully closed and fully open (assuming no other constraints are in place). In short, the door will be level, balanced, well-positioned, and secure. However, if not, the door would be imbalanced and may not open and close properly.

Consequently, various types of devices have been developed as aids to help carpenters and home handymen to precisely place components with respect to each other. For instance, tools and templates are known for locating hinge recesses in door frames and in the adjacent edges of doors to be hinged on the frames. Such tools and/or templates are adapted to be positioned against, for example, the jamb of the door and the door edge to guide a tool for routing out the hinge recesses in the jamb and the door. Such hinge templates have been developed to provide woodworkers with fast, easy, reliable techniques for installation of hardware components, like hanging doors in door frames.

Applicant believes that a related application corresponds to US Granted U.S. Pat. No. 9,333,642 ('642 patent) which discloses a cabinet jig device with adjustable fasteners and related methods. The disclosed cabinet jig device may include first and second crossbars, each crossbar having opposing first and second ends, a first leg extending between the first ends of the first and second crossbars, and a second leg extending between the second ends of the first and second crossbars. The cabinet jig device may include first and second adjustable fasteners for coupling the first leg respectively to the first ends of the first and second crossbars, third and fourth adjustable fasteners for coupling the second leg respectively to the second ends of the first and second crossbars, and first and second adjustable striking pins coupled to the second crossbar between the first and second ends thereof.

Such a singular device of the '642 patent is particularly limited to the purpose of aligning various hardware components, but may not be suitable for various other steps involved in hardware component installation, and is thus limited in terms of scope. Other documents describing the closest subject matter provide for a number of more or less complicated features that fail to solve the problems described above in an efficient and economical way. None of the documents suggest the novel features of the present invention.

SUMMARY OF THE INVENTION

It is one of the objectives of the present invention to provide a system and method for installation of cabinet doors which can be used for installation of cabinet doors.

It is another objective of the present invention to provide a system and method for installation of cabinet doors comprising a set of jigs which can be adjusted to fit in different cabinets.

It is another objective of the present invention to provide a system and method for installation of cabinets doors that includes jigs molded from plastic which can be easily distributed and stored.

It is yet another objective of the present invention to provide a system and method for installation of cabinet doors which is simple and intuitive to use, in order to be utilized by both novice and professional users.

It is still another objective of the present invention to provide a hardware installation kit with multiple jigs which is inexpensive to manufacture so as to be affordable for home users as well.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
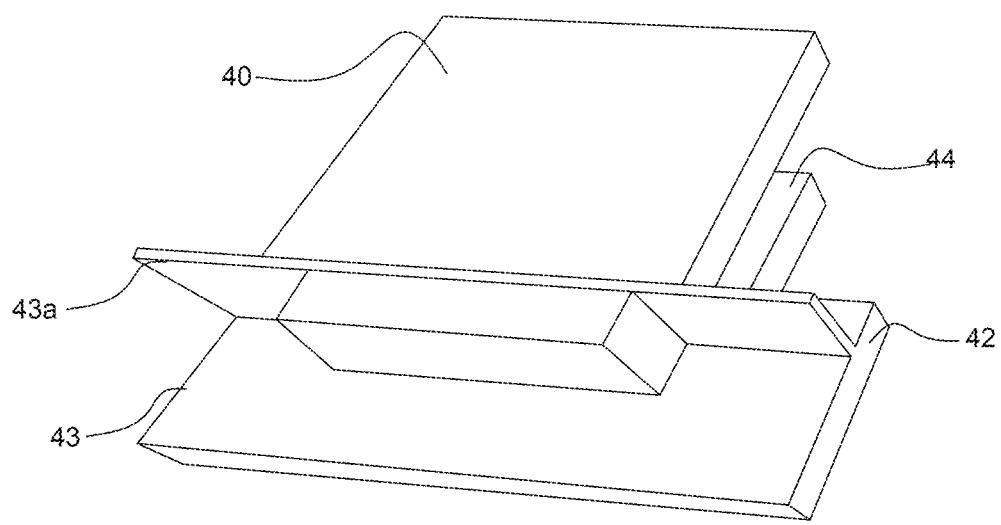
FIG. 1 illustrates a diagrammatic view of a door support 40.

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments Referring now to the drawings, where the present invention is generally referred to with numeral 10, it can be observed that it basically includes a method 10 which uses different individual jigs to installation of cabinet door 104. The method 10 has a first step 22, a second step 24, a third step 26 and a fourth step 28. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Referring to the accompanied drawings, illustrated are diagrammatic views of different individual jigs (and their implementations for installation of hardware components) from which one or more may (possibly all) form part of a system with multiple jigs to aid in hardware installation (hereto referred as hardware installation kit), in accordance with various embodiments of the present disclosure. It may be appreciated that although no single drawing illustrates present hardware installation kit in its completed form, but individual jigs thereof are shown in various accompanied drawings which may be arranged as a set in some suitable casing or the like, for ready perusal of the user.

It should be understood that individual jig in hardware installation kit are used together to ease the installation of cabinet door 104. The various jigs of the presently disclosed hardware installation kit are simple in construction and operation and eliminate all the relatively complex adjustments and manipulations required with prior jigs of this general type thereby to reduce the time and skill required in installation of hardware components. A structural description of each of the individual jigs in hardware installation kit is provided followed for a description of method 10 for its use.

Referring now to FIG. 1 it can be observed that the door support 40 may include a unitary body structure 42, a slot 43 and extending elements 44. The unitary body structure 42 may have a rectangular shape. It also may be suitable for the unitary body structure 42 to have a circular shape, a triangular shape, or any other suitable shape. The unitary body structure 42 may have a protruding element 43a extending upwardly from a top-rear portion thereof. The protruding element 43a may have a rectangular shape. The protruding element 43a may be perpendicularly attached to the unitary body structure 42 defining the slot 43. The slot 43 may have a rear wall and a bottom wall. The rear wall of the slot 43 may be the protruding element 43. The bottom wall of the slot 43 may be a portion of the unitary body structure 42.

The extending elements 44 may extend outwardly from a rear portion of the unitary body structure 42. The extending elements 44 may substantially have a rectangular shape. The extending elements 44 may be perpendicular to the protruding element 43a. The extending elements 44 may be parallel one to the other. The extending elements 44 may be separated a predetermined distance one of the other defining a channel. In a preferred embodiment best illustrated in FIG. 2A the door support 40 may be inserted in a vertical element such a compartments division. The door support 40 may be inserted in the vertical element through the channel defined by the extending elements 44. The door support 40 may provide support to the closest portion of the cabinet door 104. A portion of the cabinet door 104 may stand on slot 43.

Door support 40 may be made for ⅝ or ¾ cabinets, which are standard size cabinets as known in the art. Further, door support 40 can be utilized for 2-tier cabinets as known in the art. Door support 40 can be used for supporting both left and right sided cabinet doors. Door support 40 can eliminate the need to use bottom brace support with a clamp, as required conventionally. That is, door support 40 replaces the need of having pieces and clamps for supporting the door at required position with desired gap for allowing fitting with the cabinet body, during installation thereof. Door support 40 provides hands-free vertical and horizontal alignment of the cabinet door at required position. In a preferred embodiment the door support 40 may be made of plastic. It also may be suitable for the door support 40 to be made of metal, wood, or any other suitable material.

Figure 2:
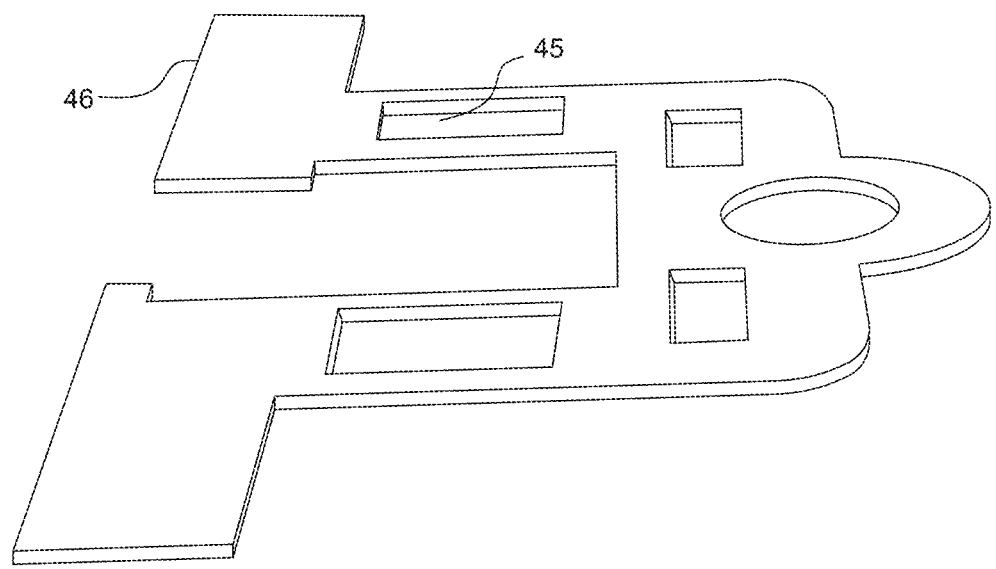
FIG. 2 illustrates a diagrammatic view of a hinge spacer 46.
Figure 2A:
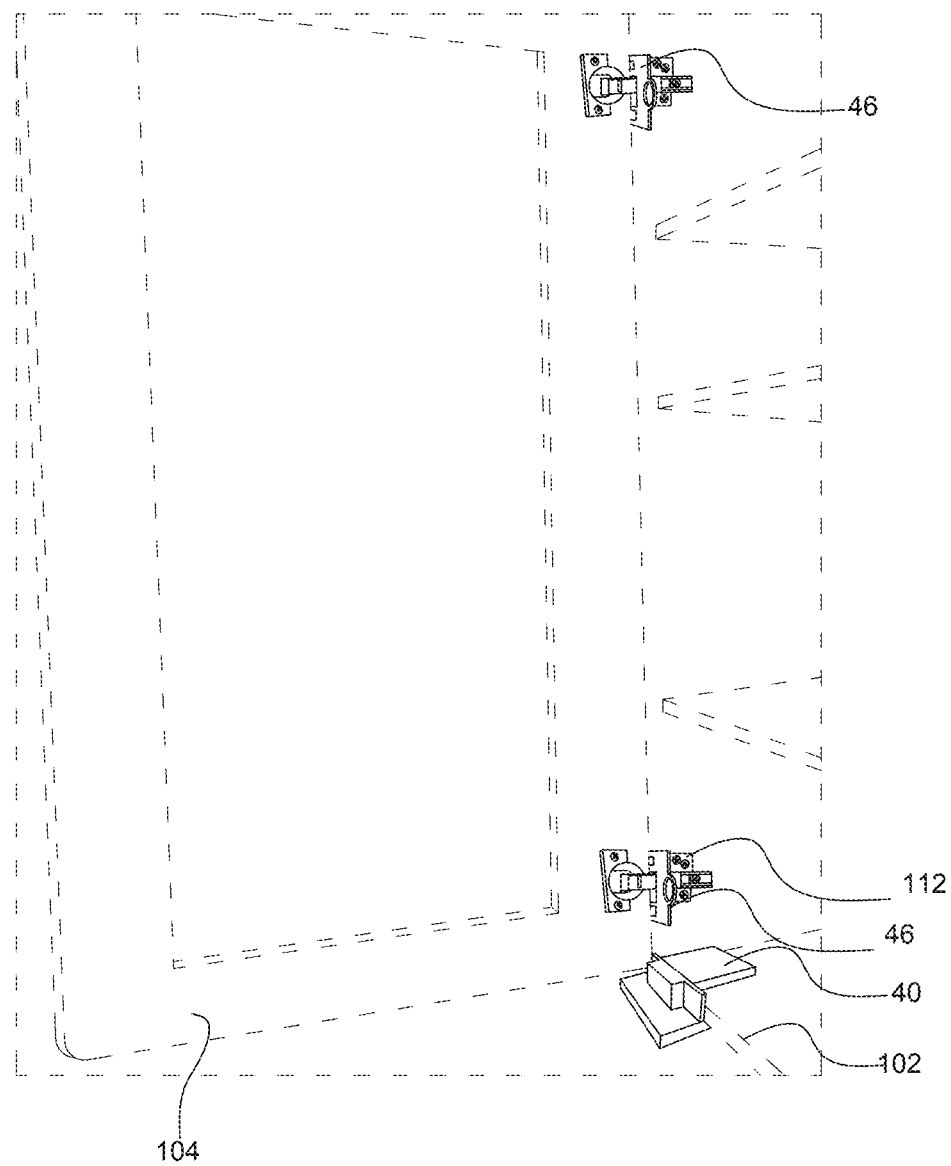
FIG. 2A illustrates a diagrammatic view of the door support 40 of FIG. 1A and the hinge spacer 46 of FIG. 1B being implemented for installation of a cabinet door 104 onto a cabinet 102.

Referring now to FIG. 2 it can be observed that the hinge spacer 46 may include openings 45. The hinge spacer 46 may have a pseudo three-centered arch shape. The hinge spacer 46 may have two legs connected by a top portion. The hinge spacer 46 may be made of plastic. It also may be suitable for the hinge spacer 46 to be made of wood, metal, or any other suitable material. Hinge spacer 46 can be used against one of the walls of the cabinet to which the door needs to be installed (as shown in FIG. 2A), to locate proper position for installation of hinges thereon, which in turn may support the cabinet door for the cabinet. Hinge spacer 46 replaces the need to use clamps and/or biscuits as a spacer during installation of the cabinet door, as known in the art; thus, eliminating the need of carrying and handling multiple tools, like cumbersome wood biscuits and wood spacers. Hinge spacer 46 provides needed variability and flexibility to be used for installation of various types and sizes of cabinet doors, or specifically hinges therefor. As discussed, FIG. 2A depicts the hinge spacer 46 being implemented for installation of the cabinet door 104.

Figure 3:
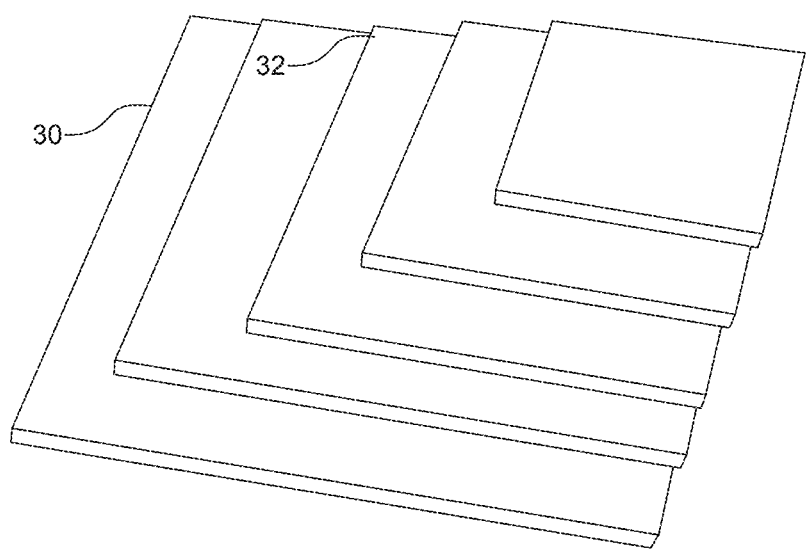
FIG. 3 illustrates a diagrammatic view of a multi-dimension spacer 30.
Figure 3A:
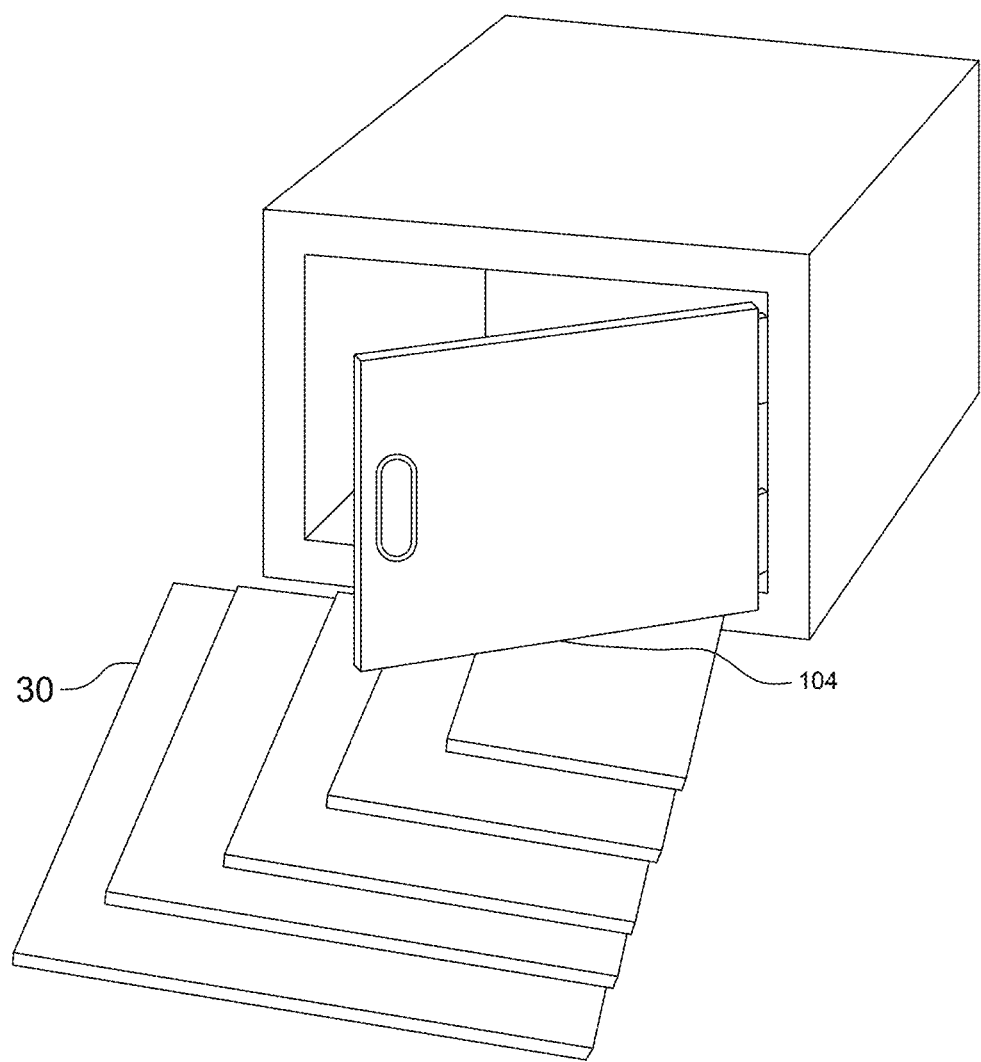
FIG. 3A shows an isometric operational view of the multi-dimensional spacer 30 being used to give a predetermined separation between the floor and the bottommost end of the cabinet door 104.
Figure 4:
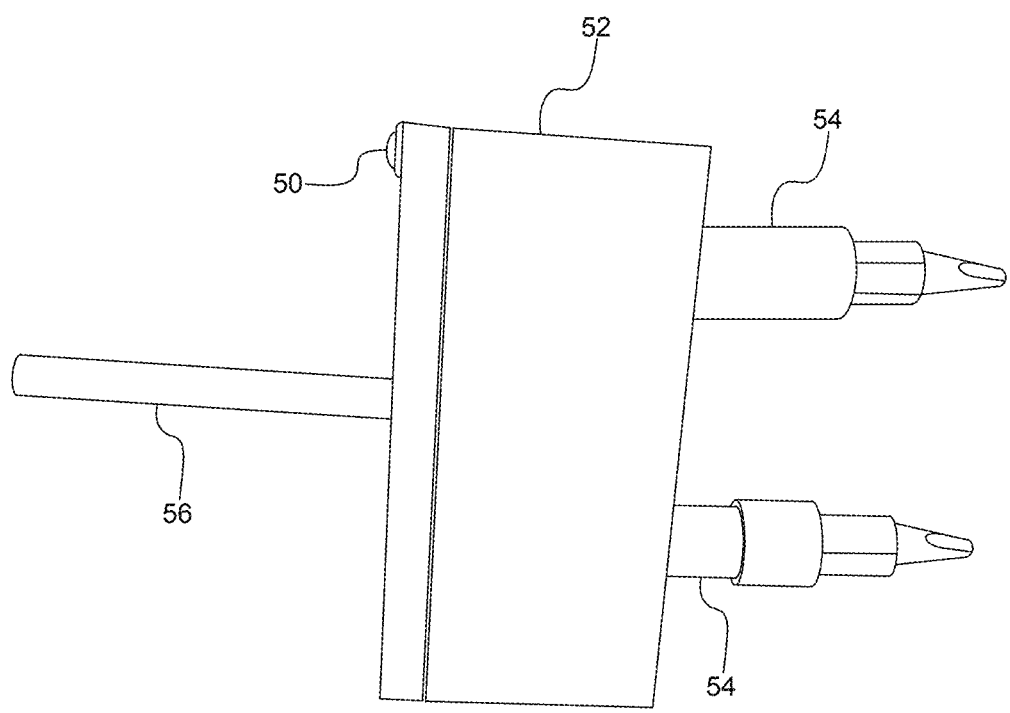
FIG. 4 illustrates a diagrammatic view of a multi drill-bit jig 50.

The multi-dimension spacer 30 may have levels 32. The levels 32 may have a square shape. The levels 32 may extend one above the other. The bottommost level of levels 32 has a predetermined size. The level located over the bottommost level of the levels 32 may have a larger size that the predetermined size of the bottommost level of levels 32. The levels 32 may constantly decrease in size from bottom to top. The levels 32 may have a predetermined thickness. The predetermined thickness may increase depending on how high they are in the dimension spacer 30. The multi-dimension spacer 30 may also be used as a marking tool for inner areas, such as tracks of a drawer. In the present illustrated embodiment, multi-dimension spacer 30 is shown to include four number of measurement steps, which may, in one example, provide ¼, ⅛, 1/16 and 1/32 length measurements. In some examples, each measurement could be color coded for quick identification. As best shown in FIG. 3A the multi-dimension spacer 30 may be used to support a distal end of cabinet door 104. The distal end of the cabinet door 104 is opposite to the proximal end of the cabinet door 104. The proximal end of the cabinet door is hingedly attached to the cabinet 102.

The multidrill-bit jig 50 of the present disclosure provides a novel component with interchangeable bits with quick release fasteners for drill bits and screws, so as to accommodate any standard drill machine. As illustrated, multi drill-bit jig 50 includes a body 52 with at least two extensions 54 properly sized and having gap therebetween for accommodating into two holes or the like at a particular standardized gap, as may be predefined for installation of cabinetry components. Further, multi drill-bit jig 50 includes a quick release fastener 56 to allow for holding of various standard sized drill bits and screws. Thus, by using multi drill-bit jig 50, a user can directly drill holes at required position for installation of a hinge or the like without need of making cumbersome measurements and markings, as done conventionally. Multi drill-bit jig of the present disclosure can be used with standard bit drilling tools without any limitations.

Figure 5:
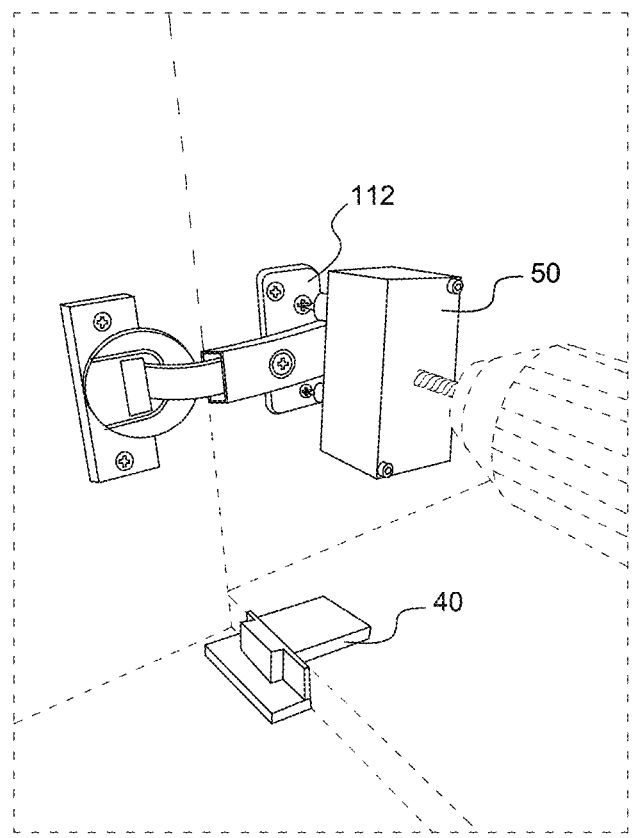
FIG. 5 illustrates a diagrammatic view of the multi drill-bit jig 50 of FIG. 5 being implemented for installation of hinges 112 for a cabinet 102.

FIG. 5 illustrates a diagrammatic view of the multi drill-bit jig 50 of FIG. 5 being implemented for installation of hinges 112 for a cabinet 102. Multi drill-bit jig 50 may be used with standard bit drilling tools without any limitations. The transmission mechanism for the multi drill-bit jig 50 is widely known in the prior art. The multi drill-bit jig 50 may include a plurality of extensions 54 although hinges 112 for cabinet doors 104 normally include two openings for insertion of fasteners therethrough. In one embodiment the at least two extensions 54 are movable along the front face of the multi drill-bit jig 50.

The present hardware installation kit with various jigs 40, 46, 30, 4 50 work in unison creating a cabinet door installation system, using different types and brands of hardware. Hardware installation kit consists of a varieties of jigs to install cabinet doors. All components of hardware installation kit are standard to the industry, do not require tools, eliminate the need of other helping labor or person, and offers hands-free solution in most instances, during cabinetry assembly. Such hardware installation kit may be useful for hardware component installation in kitchen, bathrooms, wall units in rooms, etc. Hardware installation kit is therefore time saving, labor saving and cost saving. Further, this allows to retain accuracy by eliminating the need of manual measurements and markings which is error-prone and prevent eye-balling which would later lead to significant errors and thereby wastage of time and material. The installation kit may be used to install cabinet doors through method 10.

Figure 6:
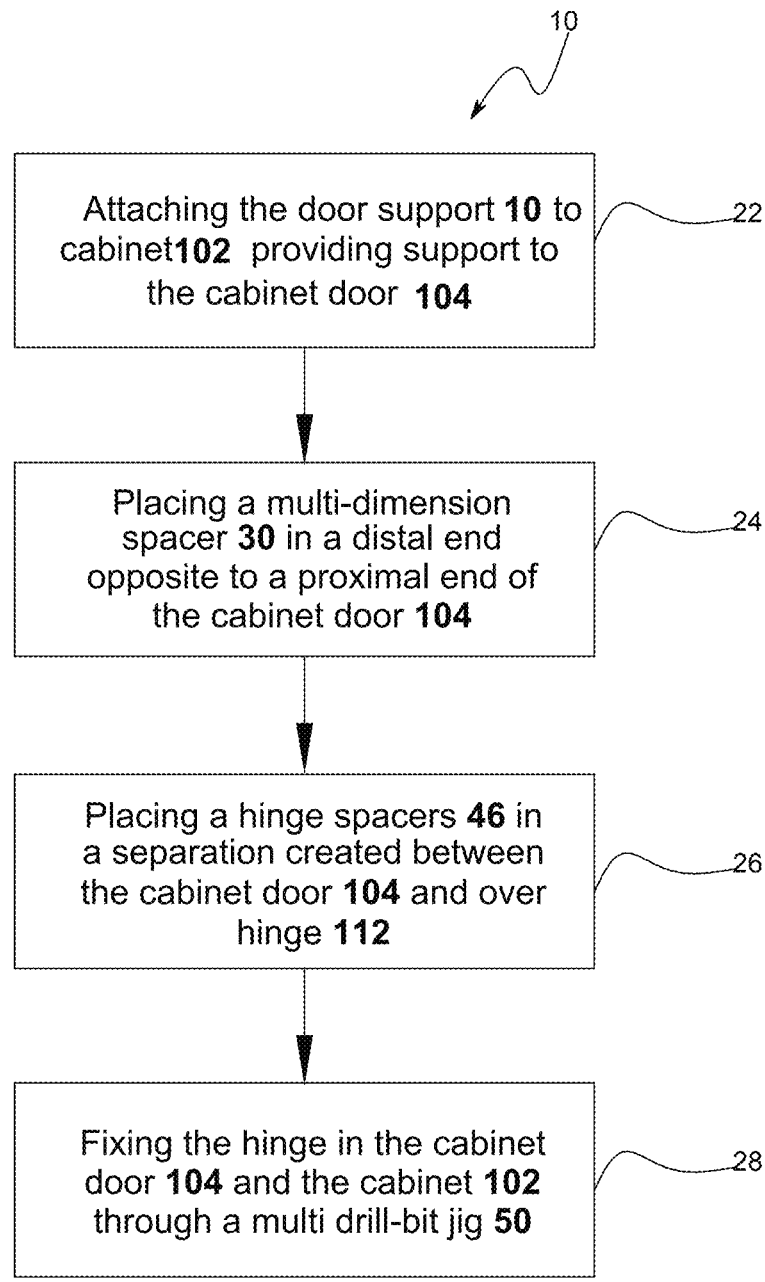
FIG. 6 shows a diagram of the method 10 for installation of jigs.

Referring now to FIG. 6 the method 10 may include a first step 22, a second step 24, a third step 26 and a fourth step 28. The first step 22 may include attaching the door support 40 in cabinet 102 to provide support to the cabinet door 104. The door support 40 may be inserted on a portion of cabinet 102. As best shown in FIG. 2A the door support 40 may provide support to the proximal end of the cabinet door 104. The door support 40 may help to hold the cabinet door 104 in a predetermined position with respect to the cabinet 102.

The second step 24 may include placing the multi-dimension spacer 30 in the distal end of the cabinet door 104. The multi-dimension spacer 30 may be placed on the distal end of the cabinet door 104 to provide an even support for the cabinet door before fixing the cabinet door 104 to cabinet 102. The multi-dimension spacer 30 may be adapted to different separation between the bottommost end of the cabinet door 104 and the floor.

The third step 26 may include placing the hinge spacer 46 in a separation created between the cabinet door 104 and a wall of the cabinet 102. The hinges 112 may be placed connecting an inner wall of the cabinet 102 and the cabinet door 104. The hinge spacer 46 may be used to provide a consistent and even placing of the hinges 112 before being fixed to said cabinet door 104 and said cabinet 102. The hinge spacer 46 may be used to provide an even separation between the cabinet door 104 and cabinet 102 before installing the hinges 112. The hinge spacer 46 may further be used surrounding a portion of the hinges 112 to secure a straight attachment of hinges 112 in the cabinet door 104 and in the wall of the cabinet 102.

A fourth step 28 may include fixing the hinges 112 by means of the multi drill-bit jig 50. In a preferred embodiment a drill may be operatively connected to the multi drill-bit jig 50 through the quick release fastener 56. The quick release fastener 56 may transmit the rotational movement of the drill to the drill-bit jig 50. The multi drill-bit jig 50 may transmit the rotational movement of the drill to at least two extensions 54. The at least two extensions 54 may be adapted to include a slotted head, a Phillips head, a square drive head or any other suitable head for insertion of fasteners to the hinges 112. The hinges 112 may be attached to the cabinet door 104 and to the cabinet 102 through fasteners. The fasteners may be evenly fixed with the hinges 112 through the multi drill-bit jig. The present method 10 in use of installation kit provides a precise and easy way to install cabinet door 104 to cabinet 102.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense in any manner.

What is claimed is:

1. A method for installation of cabinet doors, comprising:
attaching a door support in a portion of a cabinet to provide support to a proximal end of a cabinet door, wherein a portion of said door support is capable of being inserted in a vertical element of said cabinet;
placing a spacer in a distal end opposite to said proximal end of said cabinet door;
placing a hinge spacer in a separation created between said cabinet door and a wall of said cabinet and over a hinge, wherein said hinge is in abutting contact with said wall and said cabinet door; wherein said hinge spacer has an arch shape wherein a central portion of said hinge spacer is hollow; wherein said hinge is vertically placed on said central portion of said hinge spacer, wherein said hinge spacer provides an even support to said hinge; and
fixing said hinge by means of a multi drill-bit jig, wherein said hinge connects said wall with said cabinet door.

2. The method for installation of cabinet doors set forth in claim 1, wherein said door support has a unitary body structure having a protruding element, wherein said protruding element extends perpendicularly with said unitary body defining a slot, said slot having a bottom wall and a rear wall, wherein said proximal end of said cabinet door is placed resting over said bottom wall.

3. The method for installation of cabinet doors set forth in claim 2, wherein said door support has two extending elements, wherein said two extending elements extend perpendicularly from said protruding element, said two extending elements are parallel therebetween, said two extending elements are separated a predetermined distance defining a channel, wherein said vertical element is inserted into said channel.

4. The method for installation of cabinet doors set forth in claim 1, wherein said hinge spacer has a plurality of openings, wherein said openings can be used to indicate a position where fasteners are capable of be introduced.

5. The method for installation of cabinet doors set forth in claim 1, wherein said spacer is constructed by stacking rectangular levels of predefined fixed dimensions.

6. The method for installation of cabinet doors set forth in claim 5, wherein said levels are capable of being implemented as a marking tool for inner areas.

7. The method for installation of cabinet doors set forth in claim 5, wherein said levels have a predetermined height, wherein upper levels of said levels are higher than lower levels.

8. The method for installation of cabinet doors set forth in claim 1, wherein said multi drill-bit jig has a body, said body having a transmission mechanism thereinto, wherein said transmission mechanism is capable of being used to transmit a rotational movement from a drill to at least two extensions.

9. The method for installation of cabinet doors set forth in claim 8, wherein said at least two extensions extend forward from said body, each extension having a head, wherein said head is capable of being used to rotate a fastener.

10. The method for installation of cabinet doors set forth in claim 8, wherein said at least two extensions have a same length therebetween, said at least two extensions are configured for accommodating into two holes at a particular gap.

11. The method for installation of cabinet doors set forth in claim 1, wherein said door support, said spacer, said hinge spacer and said multi drill-bit jig are used together defining a hardware installation kit, wherein said hardware installation kit is capable of being used to install said hinge to connect said cabinet door with said cabinet.

12. The method for installation of cabinet doors set forth in claim 1, wherein said door support, said spacer and said hinge spacer are molded in plastic.

13. A method for installation of cabinet doors, consisting of:
- attaching a rear portion of a door support to a vertical element of a cabinet, wherein a proximal end of a cabinet door stands over a front portion of said door support, wherein said rear portion includes two extending elements protruding outwardly, said two extending elements define a channel, wherein said vertical element is inserted in said channel;
- placing a spacer in a distal end opposite to said proximal end of said cabinet door, wherein said spacer is constructed by stacking rectangular levels of predefined fixed dimensions, said spacer is adapted to provide predetermined separations between said cabinet door and a predetermined surface, wherein said stacking rectangular levels are reduced in length and width as they are positioned higher in said spacer;
- placing a hinge spacer in a separation created between said cabinet door and a wall of said cabinet and over a hinge, wherein said hinge is in abutting contact with said wall and said cabinet door, wherein said hinge spacer has an arch shape having a hollow central portion, wherein said central portion of said hinge spacer is placed enclosing a portion of said hinge, said hinge spacer providing an even support to said hinge, wherein said hinge spacer has a plurality of openings, wherein said openings can be used to indicate a position where fasteners are capable of be introduced; and
- fixing said hinge by means of a multi drill-bit jig, wherein said hinge connects said wall with said cabinet door, wherein said multi drill-bit jig has a body, said body having a transmission mechanism thereinto, wherein said transmission mechanism is capable of being used to transmit a rotational movement from a drill to at least two extensions, wherein said at least two extensions extend forward from said body, each extension having a head, wherein said head is capable of being used to rotate a fastener, wherein said at least two extensions have a same length therebetween, said at least two extensions are configured for accommodating into two holes at a particular gap, wherein said door support, said spacer, said hinge spacer and said multi drill-bit jig are used together defining a hardware installation kit, wherein said hardware installation kit, wherein said hardware installation kit is capable of be used to install said hinge to connect said cabinet door with said cabinet.

* * * * *